United States Patent [19]

Kotani et al.

[11] Patent Number: 5,567,663
[45] Date of Patent: Oct. 22, 1996

[54] CORDIERITE HONEYCOMB CERAMICS AND METHOD PRODUCING THE SAME

[75] Inventors: Wataru Kotani, Kasugai; Yoshiro Ono; Kazuhiko Kumazawa, both of Nagoya, all of Japan

[73] Assignee: NGK Insulators, Ltd., Japan

[21] Appl. No.: 397,760

[22] Filed: Mar. 2, 1995

[30] Foreign Application Priority Data

Mar. 7, 1994 [JP] Japan .................................. 6-035725

[51] Int. Cl.⁶ .................................................. C04B 35/195
[52] U.S. Cl. ...................... 501/119; 501/112; 501/153; 264/43
[58] Field of Search ............................ 501/112, 119, 501/153; 264/43, 45.9

[56] References Cited

U.S. PATENT DOCUMENTS

| | | | |
|---|---|---|---|
| 3,885,977 | 5/1975 | Lachman et al. | 501/119 X |
| 4,476,236 | 10/1984 | Inoguchi et al. | 501/119 X |
| 4,598,054 | 7/1986 | Mochida et al. | 501/119 X |
| 4,722,916 | 2/1988 | Watanabe et al. | 501/119 X |
| 5,409,870 | 4/1995 | Locker et al. | 501/119 |

FOREIGN PATENT DOCUMENTS

| | | |
|---|---|---|
| 49-129704 | 12/1974 | Japan . |
| 61-178038 | 8/1985 | Japan . |
| 64-3067 | 1/1989 | Japan . |

OTHER PUBLICATIONS

Definition of Talc, *Mineralogy*, (1959) pp. 507–508.

*Primary Examiner*—Karl Group
*Attorney, Agent, or Firm*—Parkhurst, Wendel & Burr, L.L.P.

[57] ABSTRACT

Cordierite honeycomb ceramics comprises a cordierite phase as a main ingredient. A value of [$Fe_2O_3$ wt %/(MgO wt %+$Fe_2O_3$ wt %)]×100 is 2–10, where a ferric component is calculated as $Fe_2O_3$. A thermal expansion coefficient of the cordierite honeycomb ceramics is less than $0.5×10^{-6}/°$ C. within a temperature range of 40°–800° C. in a direction parallel to a flow passage of a honeycomb body. In the cordierite honeycomb ceramics including a ferric component, a ferric component is added from a talc as raw materials. The cordierite honeycomb ceramics having a low thermal expansion coefficient is obtained by mixing raw materials for cordierite generation to obtain a batch, extruding the batch into a honeycomb formed body, drying the honeycomb formed body, and firing the dried honeycomb formed body at a temperature range of 1350°–1450° C. After that, the sintered honeycomb body is immersed in an acid solution if necessary.

8 Claims, No Drawings

5,567,663

CORDIERITE HONEYCOMB CERAMICS AND METHOD PRODUCING THE SAME

BACKGROUND OF THE INVENTION

1. Field of the Invention

The present invention relates to a cordierite honeycomb ceramic having a low thermal expansion coefficient and excellent heat resistivity, which is especially used for a catalyst carrier for an exhaust gas from automobiles and a filter for trapping soot included in an exhaust gas from a diesel engine, and a method of producing the same.

2. Related Art Statement

Cordierite honeycomb ceramics have an excellent heat resistivity, and thus they are used for a catalyst carrier for an exhaust gas from automobiles and a filter for trapping soot included in an exhaust gas from a diesel engine. In these fields, a high thermal shock resistivity is also required in addition to an excellent heat resistivity. If a thermal shock resistivity is low, various problems, such as crack generation and so on, occur due to rapid heating, a rapid cooling and a temperature difference in a body of cordierite honeycomb ceramics. Therefore, the life of the cordierite honeycomb ceramic is shortened. In order to make a thermal shock resistivity high, it is necessary to make a thermal expansion coefficient of cordierite honeycomb ceramics low. Heretofore, various experiments are performed for making a thermal expansion coefficient of cordierite honeycomb ceramics low.

Japanese Patent Laid-open Publication No. 64-3067 (JP-A-64-3067) discloses a method of making a thermal expansion coefficient of cordierite honeycomb ceramics low by controlling a particle size of raw materials for cordierite generation such as talc, kaolin and silica so as to improve thermal shock resistivity. However, in this method, it is necessary to limit porosity to 30–42% so as to maintain such an excellent thermal shock resistivity, and thus a filter made of cordierite honeycomb ceramics according to this method is not preferably used as a filter for trapping soots included in an exhaust gas from a diesel engine.

Moreover, Japanese Patent Laid-open Publication No. 49-129704(JP-A-49-129704) discloses a method such that a body of cordierite ceramics is brought into contact with an acid solution so as to improve thermal shock resistivity of the body of cordierite ceramics. In the body of cordierite ceramics treated by an acid solution, thermal shock resistivity is temporarily improved, since a thermal expansion coefficient is lowered. However, if the body is maintained for a long time in a high temperature condition such as a filter for trapping soot included in an exhaust gas from a diesel engine, the thermal expansion coefficient is increased, and thus an effect of improving thermal shock resistivity disappears.

Generally, in order to make a thermal expansion coefficient low on producing cordierite honeycomb ceramics, amounts of impurity components in raw materials are lowered. For example, if an amount of CaO component included in raw materials for cordierite generation is increased, a thermal expansion coefficient of cordierite honeycomb ceramics becomes high. Moreover, as for a ferric component and the like, it is generally understood that it is better that a ferric component and the like is not included in cordierite honeycomb ceramics. This is because a ferric component is liable to be dissolved in a solid state in chlorite, which exists in talc as an impurity component. That is to say, a chlorite crystal having a ferric solid solution becomes a glass phase by firing, and becomes a cause of increased thermal expansion coefficient of cordierite honeycomb ceramics.

Japanese Patent Laid-open Publication No. 61-178038 (JP-A-61-178038) discloses a catalyst carrier in which an $Fe_2O_3$ component is mixed in cordierite honeycomb ceramics and a coloring of the catalyst carrier is performed while maintaining a thermal expansion coefficient under $1.6 \times 10^{-6}/°C$. However, in this case, the $Fe_2O_3$ component functions only to color the catalyst carrier, and a thermal shock resistivity is affected since a thermal expansion coefficient is high.

Summary of the Invention

It is an object of the invention to eliminate the drawbacks mentioned above and to provide cordierite honeycomb ceramics and a method of producing the same, which can maintain excellent thermal shock resistivity and a small variation in thermal expansion coefficient, when used under a high temperature for a long time, by improving a batch component for cordierite honeycomb ceramics.

According to the invention, the cordierite honeycomb ceramic comprises a cordierite phase as a main ingredient, wherein a value of $[Fe_2O_3 \text{ wt \%}/(MgO \text{ wt \%} + Fe_2O_3 \text{ wt \%})] \times 100$ is 2–10, where a ferric component is calculated as $Fe_2O_3$, and a thermal expansion coefficient is less than $0.5 \times 10^{-6}/°C$. within a temperature range of 40°–800° C. in a direction parallel to a flow passage of a honeycomb body.

According to the invention, a method of producing the cordierite honeycomb ceramic comprises the steps of mixing raw materials for cordierite generation such as talc, alumina, silica and the like with forming agents and solvents to obtain a batch, extruding said batch into a honeycomb formed body, drying said honeycomb formed body, and firing the dried honeycomb formed body at a temperature range of 1350°–1450° C., wherein said talc has a ferric component satisfying a value of $[Fe_2O_3 \text{ wt \%}/(MgO \text{ wt \%} + Fe_2O_3 \text{ wt \%})] \times 100$ is 2–10, where a ferric component is calculated as $Fe_2O_3$.

In these constitutions, it is possible to obtain a cordierite honeycomb ceramics and a method of producing the same, which can maintain excellent thermal shock resistivity and a small variation in thermal expansion coefficient, when used under a high temperature for a long time, by improving a batch component the cordierite honeycomb ceramic.

DESCRIPTION OF THE PREFERRED EMBODIMENT

During many experiments, the inventors formed a cordierite honeycomb ceramic including an excessive amount of ferric component as compared with normal cordierite honeycomb ceramics, and treated the thus obtained cordierite honeycomb ceramic by an acid solution. As a result, the inventors discovered a cordierite honeycomb ceramic which can maintain an excellent thermal shock resistivity and a small variation in thermal expansion coefficient, when used under a high temperature for a long time.

In the cordierite honeycomb ceramics mentioned above, an amount of ferric component satisfies such a condition that a value of $[Fe_2O_3 \text{ wt \%}/(MgO \text{ wt \%} + Fe_2O_3 \text{ wt \%})] \times 100$ (hereinafter, referred as M value) is 2–10, where a ferric component is calculated as $Fe_2O_3$, and a thermal expansion coefficient satisfies such a condition that it is less than $0.5 \times 10^{-6}/°C$. within a temperature range of 40°–800° C. in a direction parallel to a flow passage of a honeycomb body.

If a thermal expansion coefficient is not less than $0.5 \times 10^{-6}/°C.$, cracks are generated due to thermal shock, and thus the life of the cordierite honeycomb ceramic is shortened. In the present invention, since an excess amount of ferric component is included in a cordierite phase, it is possible to maintain a low thermal expansion coefficient, if the cordierite honeycomb ceramic body is immersed in an acid solution and then used under a high temperature.

Moreover, in the cordierite honeycomb ceramic mentioned above, it is preferred to set the M value to 3–7. Further, it is preferred that a porosity is more than 45%, and a thermal expansion coefficient is less than $0.3 \times 10^{-6}/°C.$ In this case, if a porosity is not more than 45%, the cordierite honeycomb ceramic body is not effectively used for a filter for trapping soot included in an exhaust gas from a diesel engine, since a pressure loss is increased.

The cordierite honeycomb ceramic according to the invention is produced by mixing raw materials for cordierite generation such as talc, alumina, silica with forming agents and surface active agents to obtain a batch, extruding the batch into a honeycomb shape to obtain a formed honeycomb body, drying the formed honeycomb body, and firing the honeycomb body after drying in a temperature range of 1350°–1450° C. In this case, the M value in talc is set to 2–10. Moreover, if the firing temperature is not more than 1350° C., a cordierite phase is not generated, and if the firing temperature is not less than 1450° C., a cordierite phase is melted. As mentioned above, since an excess amount of ferric component is included in a cordierite phase from raw materials for cordierite generation, it is possible to maintain a low thermal expansion coefficient, if the cordierite honeycomb ceramic body is immersed in an acid solution and then used under a high temperature. Further, it is preferred to set the M value to 3–7.

Generally, a thermal expansion coefficient of the cordierite honeycomb ceramic body after firing can be decreased by immersing it in an acid solution. In the cordierite honeycomb ceramic body having a cordierite phase in a main ingredient and the M value of 2–10 according to the present invention, it is further necessary to set a weight reduction rate after immersing to 0.5–2.0%. In this case, if the weight reduction rate is not more than 0.5%, an effect of low thermal expansion coefficient is small, and if the weight reduction rate is not less than 2.0%, a strength of the cordierite honeycomb ceramic body is extremely lowered, since an large amount of cordierite crystal is dissolved together with a impurity phase to be dissolved.

As for an acid solution, use is made of hydrochloric acid, sulfuric acid, fluoric acid, nitric acid, and so on, but it is preferred to use a nitric acid since it is inexpensive.

As for the M value of the cordierite honeycomb ceramic body, if the M value is not more than 2, a low thermal expansion coefficient obtained by the acid solution treatment is returned to a large value by the use under a high temperature, and thus an effect of the acid solution treatment such as an improvement in thermal shock resistivity is not maintained. Moreover, if the M value is not less than 10, a softening point of the cordierite honeycomb ceramic body is decreased, and thus a variation of a dimension and a breakage by melting occur.

In the method of producing cordierite honeycomb ceramic according to the invention, in order to add a ferric component in the cordierite phase, use is made of talc including an excess amount of a ferric component, i.e. a talc having about 0.3 wt % of $Fe_2O_3$. Therefore, an increase in thermal expansion coefficient due to a ferric component as an impurity can be eliminated, and thus a heat resistivity after an acid solution treatment can be improved. As for talc, it is preferred to use talc including no chlorite crystal. This is because, if a large amount of chlorite is included in talc, a ferric component is dissolved in a chlorite crystal as an impurity, and a thermal expansion coefficient is liable to be increased due to the ferric component as an impurity. Moreover, if a ferric component is added by itself, it is preferred to use FeO component so as to improve a heat resistivity after the acid solution treatment. This is because FeO component is liable to be replaced with Mg component in a cordierite crystal as compared with $Fe_2O_3$ component, and thus Fe component is liable to be dissolved in a cordierite crystal. However, in this case, a thermal expansion coefficient before the acid solution treatment is increased, and thus a thermal shock resistivity is not improved largely.

From the results of the various experiments mentioned above, it is assumed that a ferric component dissolved in a cordierite crystal is effective to obtain an excellent heat resistivity after the acid solution treatment.

Usually, almost all the ferric component included in cordierite honeycomb ceramic is dissolved in chlorite crystal which is included in talc as an impurity. In the present invention, as for talc raw materials, use is made of talc in which a ferric component is dissolved by replacing Mg component in talc crystal not in chlorite crystal. Therefore, a thermal expansion coefficient after firing is not affected by a ferric component as compared with the case in which a ferric component exists in the cordierite honeycomb ceramic as an impurity.

It is known that the reason for decreasing a thermal expansion coefficient of the cordierite honeycomb ceramic by the acid treatment is that microcracks generated between cordierite crystals are opened and a thermal expansion does not occur so much due to the opened microcracks. Moreover, if the cordierite honeycomb ceramic body after the acid solution treatment is aged under a high temperature, the microcracks are closed by an amorphous substance generated on a surface of the cordierite crystal, and the effect of reducing a thermal expansion disappears. In this case, it is assumed that the amorphous substance is made of a glass phase generated by a reaction between an impurity component in a cordierite fired body and a magnesia.

The inventors find that a ferric component as an impurity is decreased by dissolving a ferric component in a cordierite crystal and that the ferric component dissolved in a cordierite fired body is served as controlling the reaction between the impurity and the magnesia. Moreover, the inventors find that a phase generated by the dissolved ferric component and the ferric component as the impurity is included in the amorphous phase and that a deposition temperature of the phase included in the amorphous phase is increased. Therefore, the microcracks are not closed if used at a high temperature, and thus a thermal expansion coefficient is not returned and is maintained.

Hereinafter, an actual embodiment will be explained.

METHOD OF PRODUCING

Producing of cordierite honeycomb ceramic

Cordierite honeycomb ceramic according to the invention are produced as follows.

At first, raw materials for cordierite generation such as talc, kaolin, alumina, silica and the like are mixed with forming agents such as methyl cellulose, surface active agent and the like and solvents such as water, alcohol and the like to obtain a batch having a chemical composition of $SiO_2$:42–56 wt %, $Al_2O_3$:30–45 wt % and MgO:12–16 wt % whose center composition is a theoretical chemical composition of cordierite. The thus obtained batch is extruded into a honeycomb formed body. In this case, 0–50 wt % of graphite may be added as poring agents if necessary.

Then, the honeycomb formed body is fired under a temperature range of 1350°–1450° C. at which a ratio of cordierite generation proceeds sufficiently. In this case, since an included ferric component is liable to be free at near 1200° C., it is necessary to set a temperature ascending rate less than 100° C./h till 1000°–1300° C. so as to dissolve a ferric component sufficiently in a cordierite crystal.

Producing of ceramic filter

The present invention will be explained in more detail with reference to actual embodiments.

In the present invention, by adding a ferric component into a cordierite crystal from talc raw materials, it is possible to obtain a porous ceramic filter having an excellent thermal shock resistivity which can maintain low thermal expansion properties after an acid solution treatment if used under a high temperature.

As for specimens according to the invention, raw materials for cordierite generation shown in Table 1 were prepared. Then, from the raw materials for cordierite generation, raw materials for cordierite honeycomb ceramic having various amounts of ferric component were produced by using talc raw materials including various amounts of ferric component. As for specimens according to comparative examples, raw materials to which a ferric component is added by itself were also prepared. Then, these raw materials were mixed with forming agents and solvents to obtain batches, and the batches were extruded into honeycomb formed bodies having rib thickness: 0.45 mm, diameter: 43.8 mm and length:152 mm. Then, the thus obtained honeycomb formed bodies were fired. After that, both ends of the honeycomb fired bodies were sealed like a checker pattern such that if one end of each flow passage was open, the other end of this flow passage was closed to obtain ceramic filters.

PERFORMANCE ESTIMATION

Experiment condition

With respect to the thus obtained ceramic filter, a heat treatment was performed under the atmosphere at 1200° C. during 100 hours to estimate a heat stability of a lowering effect of a thermal expansion coefficient due to the acid solution treatment.

Estimation method

As for the estimation for a thermal shock resistivity, a thermal expansion coefficient in a range of 40°–800° C. of respective ceramic filters was measured by a thermal expansion coefficient measuring apparatus. Moreover, in order to estimate a heat stability of a thermal expansion coefficient, a deterioration rate of the effect of the acid solution treatment (hereinafter, referred as deterioration rate) was measured. This deterioration rate was obtained form a heat recovery rate after a heat treatment of 1200° C. for 100 hours. If this deterioration rate is low, the effect of the acid solution treatment is maintained in a high temperature, and thus it shows a good heat stability.

Moreover, with respect to the ceramic filters, a cordierite composition and amounts of $Fe_2O_3$ and CaO were measured by a fluorescent X-ray analysis.

Further, in order to make clear an effect of a ferric component addition according to the invention, not only a total amount of a ferric component ($Fe_2O_3$ amount) but also a ratio of a ferric amount with respect to a sum of a ferric amount and a magnesia amount (M value) were measured. In the case that a ferric component is dissolved in a cordierite crystal, since a ferric component is liable to be replaced with a magnesia component, the effect of a ferric component addition with respect to the heat stability of the thermal expansion coefficient after the acid solution treatment can be estimated by the M value.

Moreover, respective ceramic filters were cut out from specimens having a diameter of 1 inch and a length of 1 inch, and a transformation rate under a high temperature of the cut out specimens was measured from a transformation rate after a heat treatment at 1450° C. for 10 minutes. As for a porosity, it was measured by a mercury-porosimeter.

TABLE 1

| Batch No. | Specimen No. | Talc (wt %) particle size μm ($Fe_2O_3$ wt %) | Kaolin (wt %) particle size μm | Alumina (wt %) particle size μm | Silica (wt %) particle size μm | Thermal expansion coefficient ×10⁻⁶/40–800° C. | |
|---|---|---|---|---|---|---|---|
| | | | | | | before acid solution treatment | after acid solution treatment |
| 1 | 2 | 38.2% 60.0 μm (0.03 wt %) | 23.8% 8.7 μm | 28.0% 6.0 μm | 10.0% 100.5 μm | 1.03 | 0.19 |
| 2 | 6 | 38.8% 30.0 μm (0.03 wt %) | 41.7% 8.5 μm | 19.5% 5.5 μm | — | 0.52 | 0.11 |
| 3 | 12 | 40.7% 22.3 μm (0.03 wt %) | 16.0% 3.3 μm | 30.8% 1.8 μm | 12.5% 19.8 μm | 0.17 | −0.21 |

Acid solution treatment

The thus obtained ceramic filter was immersed in a nitric acid solution of 1.5 normality and 93° C., whose solution amount was 10 times as large as a volume of the ceramic filter, so as to perform an acid solution treatment within a range of weight reduction rate of 1±0.2%.

Estimation results

Tables 2–6 show the results of the examples according to the invention and the results of the comparative examples. In the Tables 2–6, properties of respective specimens are also shown.

TABLE 2

Known example

| Specimen No. | Raw materials | | Chemical composition of sintered body | | | | | M value* (%) | Porosity (%) |
|---|---|---|---|---|---|---|---|---|---|
| | talc (Fe$_2$O$_3$ wt %) | ferric component added by itself (wt %) | MgO | Al$_2$O$_3$ | SiO$_2$ | Fe$_2$O$_3$ | CaO | | |
| 1 | A(0.03) | — | 13.8 | 35.2 | 49.8 | 0.17 | 0.10 | 1.2 | 49 |
| 2 | A(0.03) | — | 13.6 | 35.0 | 50.4 | 0.13 | 0.20 | 0.9 | 53 |

| Specimen No. | Thermal expansion coefficient (10$^{-6}$/40–800° C.) | | | Deterioration rate of effect of acid solution treatment at 1200° C.** (%) | Deterioration rate of thermal shock resistivity with respect to known example (%) | Transformation rate under high temperature (%) |
|---|---|---|---|---|---|---|
| | before acid solution treatment | after acid solution treatment | after heat treatment at 1200° C. | | | |
| 1 | 0.74 | 0.30 | 0.74 | 100 | — | 1.07 |
| 2 | 1.03 | 0.19 | 0.93 | 88.1 | — | 0.88 |

TABLE 3

Embodiment 1

| specimen No. | | Raw materials | | Chemical composition of sintered body | | | | | M value* (%) | Porosity (%) |
|---|---|---|---|---|---|---|---|---|---|---|
| | | talc (Fe$_2$O$_3$ wt %) | ferric component added by itself (wt %) | MgO | Al$_2$O$_3$ | SiO$_2$ | Fe$_2$O$_3$ | CaO | | |
| comparative example | 2 | A(0.03) | — | 13.6 | 35.0 | 50.4 | 0.13 | 0.20 | 0.9 | 53 |
| present invention | 3 | B(0.3) | — | 13.5 | 34.8 | 50.1 | 0.25 | 0.09 | 1.8 | 52 |
| | 4 | C(0.9) | — | 13.2 | 34.9 | 50.0 | 0.56 | 0.12 | 4.1 | 52 |
| | 5 | E(1.8) | — | 13.0 | 35.1 | 50.0 | 0.95 | 0.11 | 6.8 | 54 |

| specimen No. | | Thermal expansion coefficient (10$^{-6}$/40–800° C.) | | | Deterioration rate of effect of acid solution treatment at 1200° C.** (%) | Deterioration rate of thermal shock resistivity with respect to known example (%) | Transformation rate under high temperature (%) |
|---|---|---|---|---|---|---|---|
| | | before acid solution treatment | after acid solution treatment | after heat treatment at 1200° C. | | | |
| comparative example | 2 | 1.03 | 0.19 | 0.93 | 88.1 | — | 0.88 |
| present invention | 3 | 1.10 | 0.20 | 0.78 | 64.4 | 73.1 | 0.90 |
| | 4 | 1.05 | 0.26 | 0.57 | 39.2 | 44.5 | 0.99 |
| | 5 | 0.96 | 0.23 | 0.40 | 23.3 | 26.4 | 1.16 |

TABLE 4

Embodiment 2

| Specimen No. | | Raw materials | | Chemical composition of sintered body | | | | | M value* (%) | Porosity (%) |
|---|---|---|---|---|---|---|---|---|---|---|
| | | talc (Fe$_2$O$_3$ wt %) | ferric component added by itself (wt %) | MgO | Al$_2$O$_3$ | SiO$_2$ | Fe$_2$O$_3$ | CaO | | |
| comparative example | 6 | A(0.03) | — | 14.8 | 34.5 | 50.0 | 0.18 | 0.18 | 1.2 | 47 |
| | 7 | H(3.5) | — | 13.0 | 35.0 | 49.9 | 1.54 | 0.18 | 10.6 | 53 |
| present invention | 8 | B(0.3) | — | 14.7 | 34.8 | 50.0 | 0.32 | 0.16 | 2.1 | 47 |
| | 9 | E(1.8) | — | 14.3 | 34.6 | 49.8 | 0.80 | 0.12 | 5.3 | 49 |
| | 10 | F(2.3) | — | 13.9 | 34.9 | 49.9 | 1.08 | 0.13 | 7.1 | 46 |

TABLE 4-continued

Embodiment 2

| | | | | | | | | | |
|---|---|---|---|---|---|---|---|---|---|
| | 11 | G(3.0) | — | 12.9 | 35.3 | 50.2 | 1.31 | 0.11 | 9.2 | 52 |

| Specimen No. | | Thermal expansion coefficient ($10^{-6}$/40–800° C.) | | | Deterioration rate of effect of acid solution treatment at 1200° C.** (%) | Deterioration rate of thermal shock resistivity with respect to known example (%) | Transformation rate under high temperature (%) |
|---|---|---|---|---|---|---|---|
| | | before acid solution treatment | after acid solution treatment | after heat treatment at 1200° C. | | | |
| comparative example | 6 | 0.52 | 0.11 | 0.51 | 97.6 | — | 0.92 |
| | 7 | 0.81 | 0.35 | 0.48 | 28.3 | 29.0 | partly breakage by melting |
| present invention | 8 | 0.56 | 0.12 | 0.37 | 56.8 | 58.2 | 0.90 |
| | 9 | 0.49 | 0.15 | 0.29 | 41.2 | 42.2 | 1.08 |
| | 10 | 0.53 | 0.09 | 0.21 | 27.3 | 28.0 | 1.31 |
| | 11 | 0.77 | 0.36 | 0.50 | 34.1 | 34.9 | 2.68 |

TABLE 5

Embodiment 3

| Specimen No. | | Raw materials | | Chemical composition of sintered body | | | | | M value* (%) | Porosity (%) |
|---|---|---|---|---|---|---|---|---|---|---|
| | | talc ($Fe_2O_3$ wt %) | ferric component added by itself (wt %) | MgO | $Al_2O_3$ | $SiO_2$ | $Fe_2O_3$ | CaO | | |
| comparative example | 12 | A(0.03) | — | 14.6 | 34.8 | 50.3 | 0.08 | 0.07 | 0.6 | 49 |
| present invention | 13 | C(0.9) | — | 14.3 | 34.9 | 50.1 | 0.44 | 0.04 | 3.0 | 50 |
| | 14 | D(1.3) | — | 14.2 | 34.8 | 49.9 | 0.61 | 0.06 | 4.1 | 50 |
| | 15 | F(2.3) | — | 14.0 | 35.2 | 49.1 | 1.01 | 0.03 | 6.7 | 50 |

| Specimen No. | | Thermal expansion coefficient ($10^{-6}$/40–800° C.) | | | Deterioration rate of effect of acid solution treatment at 1200° C.** (%) | Deterioration rate of thermal shock resistivity with respect to known example (%) | Transformation rate under high temperature (%) |
|---|---|---|---|---|---|---|---|
| | | before acid solution treatment | after acid solution treatment | after heat treatment at 1200° C. | | | |
| comparative example | 12 | 0.17 | −0.21 | 0.14 | 92.1 | — | 0.60 |
| present invention | 13 | 0.09 | −0.27 | −0.08 | 55.8 | 57.3 | 0.60 |
| | 14 | 0.05 | −0.32 | −0.15 | 46.4 | 50.4 | 0.87 |
| | 15 | 0.13 | −0.19 | −0.10 | 27.4 | 29.8 | 1.04 |

TABLE 6

Comparative Example

| Specimen No. | Raw materials | | Chemical composition of sintered body | | | | | M value* (%) | Porosity (%) |
|---|---|---|---|---|---|---|---|---|---|
| | talc ferric component (Fe$_2$O$_3$ wt %) | added by itself (wt %) | MgO | Al$_2$O$_3$ | SiO$_2$ | Fe$_2$O$_3$ | CaO | | |
| 12 | A(0.03) | — | 14.6 | 34.8 | 50.3 | 0.08 | 0.07 | 0.6 | 49 |
| 16 | A(0.03) | FeO 0.3 | 14.3 | 34.6 | 49.8 | 0.44 | 0.12 | 3.0 | 51 |
| 17 | A(0.03) | FeO 1.0 | 14.2 | 34.3 | 49.7 | 1.30 | 0.13 | 8.4 | 52 |
| 18 | A(0.03) | FeO 1.5 | 14.1 | 34.0 | 49.5 | 2.02 | 0.11 | 12.5 | 51 |
| 19 | A(0.03) | FeO 3.0 | 13.8 | 33.1 | 48.8 | 3.54 | 0.12 | 20.5 | 52 |
| 20 | A(0.03) | Fe$_2$O$_3$ 0.5 | 14.4 | 34.5 | 49.9 | 0.73 | 0.13 | 4.8 | 49 |
| 21 | A(0.03) | Fe$_2$O$_3$ 0.8 | 14.3 | 34.2 | 49.7 | 1.18 | 0.11 | 7.4 | 52 |
| 22 | A(0.03) | Fe$_2$O$_3$ 2.0 | 14.0 | 33.8 | 48.9 | 2.80 | 0.13 | 16.7 | 52 |
| 23 | A(0.03) | Fe$_2$O$_3$ 2.5 | 13.9 | 33.1 | 48.8 | 3.09 | 0.16 | 18.2 | 53 |

| Specimen No. | Thermal expansion coefficient ($10^{-6}$/40–800° C.) | | | Deterioration rate of effect of acid solution treatment at 1200° C.** (%) | Deterioration rate of thermal shock resistivity with respect to known example (%) | Transformation rate under high temperature (%) |
|---|---|---|---|---|---|---|
| | before acid solution treatment | after acid solution treatment | after heat treatment at 1200° C. | | | |
| 12 | 0.17 | −0.21 | 0.14 | 92.1 | — | 0.60 |
| 16 | 0.24 | −0.16 | 0.14 | 72.4 | 78.6 | 1.62 |
| 17 | 0.37 | 0.07 | 0.24 | 56.7 | 61.6 | 3.99 |
| 18 | 0.68 | 0.26 | 0.45 | 45.2 | 49.1 | partly breakage by melting |
| 19 | 0.81 | 0.33 | 0.51 | 37.8 | 41.0 | breakage by melting |
| 20 | 0.36 | 0.01 | 0.29 | 80.0 | 86.9 | 1.77 |
| 21 | 0.49 | 0.03 | 0.32 | 63.1 | 68.5 | 2.73 |
| 22 | 0.73 | 0.33 | 0.52 | 47.5 | 51.6 | breakage by melting |
| 23 | 0.77 | 0.26 | 0.50 | 47.1 | 51.1 | breakage by melting |

*M value = [Fe$_2$O$_3$/Fe$_2$O$_3$ + MgO)] × 100 (%)
**reduction rate of acid solution treatment = [(thermal expansion coefficient after heat treatment at 1200° C. − thermal expansion coefficient after acid solution treatment)/(thermal expansion coefficient before acid solution treatment − thermal expansion coefficient after acid solution treatment)] × 100

As shown in the Tables 2–6, the batches having various thermal expansion coefficients can be obtained by varying raw materials to be used, firing conditions and so on, and the batches show various corrosion resistivities with respect to an acid solution due to the conditions of a crystal phase, a porosity, and so on, thereby they show various decreasing rates of thermal expansion coefficient after the acid solution treatment. Therefore, it is necessary to estimate a heat stability of the acid solution treatment batch by batch.

Estimation of known technique

In the Table 2, the specimen Nos. 1 and 2 show known examples.

Usually, a ferric component seems as an impurity which increases a thermal expansion coefficient, and thus it is estimated that the batch including no ferric component is preferred for improving a thermal shock resistivity. However, as shown in Table 2, in the known technique, if a reduction in a thermal expansion coefficient is performed by the acid solution treatment, a thermal expansion coefficient is recovered to a level before the acid solution treatment even under a temperature of 1100° C. Therefore, in the batches according to the known examples, an effect of the acid solution treatment is not maintained.

EXAMPLE 1

It is possible to improve a heat stability of the acid solution treatment by adding a ferric component in the talc raw materials of the specimen No. 2 mentioned above. In this case, a ferric component can be stably dissolved in a talc crystal, and thus it is possible to dissolve a ferric component easily in a cordierite crystal by using the talc raw materials mentioned above as a ferric source.

In the Table 3, various properties of the systems based on the batch No. 1 (specimen No. 2) in the Table 1 are shown as the example 1.

In the specimen No. 2 according to the known example, a deterioration rate is 88%, and it is confirmed that a thermal shock resistivity is decreased to a level before the acid solution treatment. From the results of discussions about reductions of the deterioration rate and the thermal shock resistivity in respective batches, it is confirmed that, if an increasing of a thermal shock resistivity is controlled under 60% with respect to a deterioration rate according to the known example, an improving effect of the acid solution treatment with respect to a thermal shock resistivity can be maintained certainly. Therefore, in the Table 3, the deterioration rate of a thermal shock resistivity (hereinafter, referred as deterioration rate) is indicated by a percentage with respect to that of the specimen No. 2 (100%), and it is assumed that the specimens, in which the deterioration rate is under 60%, can maintain the effect of the acid solution treatment.

As shown in the specimen Nos. 3–5 in the Table 3, the deterioration rate can be improved, if the M value is made larger i.e. a ferric component is added from the talc raw materials.

EXAMPLE 2

In the Table 4, various properties of the systems based on the batch No. 2 (specimen No. 6) in the Table 1 are shown as the example 2.

The batch systems mentioned above show a low thermal expansion coefficient before the acid solution treatment as compared with the example 1 and an excellent corrosion resistivity. Moreover, in the batch systems mentioned above, a thermal expansion rate after the acid solution treatment is not decreased so much, i.e. about $0.4\times10^{-6}/°$ C. Also in the batch systems mentioned above, it is possible to improve the deterioration rate by making the M value larger as is the same as the example 1.

Further, as shown in the specimen Nos. 7 and 11, the deterioration rate can be improved largely by making the M value larger, but a transformation rate under a high temperature becomes larger corresponding to the increase of a thermal expansion coefficient. Moreover, in these cases, if the M value is not less than 10, a part of the body starts to be melted at an upper-limit temperature in a normal use. Therefore, it is necessary to limit the M value to less than 10.

Moreover, from the results shown in the example 1 and the example 2, the M value of the specimens, in which the deterioration rate is under 60%, is more than 2, and they show an excellent heat stability.

EXAMPLE 3

In the Table 5, various properties of the systems based on the batch No. 3 (specimen No. 12) in the Table 1 are shown as the example 3.

The batch systems mentioned above show an extremely low thermal expansion coefficient, and the batches after the acid solution treatment show a heat contractibility. In the batch systems mentioned above, it is possible to improve the deterioration rate by making the M value larger as is the same as the examples 1 and 2. Moreover, the specimens having the M value more than 2 have an excellent heat stability.

As mentioned above, if the M value of the batch systems is set to a range of 2–10, all the batch systems can maintain the effect of the acid solution treatment as compared with the known examples even at a high temperature over 1200° C., and also they show an excellent heat stability.
Comparative example In the Table 6, various properties of the systems, in which a ferric component is added by itself in the batch No. 3 (specimen No. 12) in the Table 1, are shown as the comparative example.

As shown in the Table 6, it is possible to form the cordierite ceramic filter according to the invention which includes a ferric component by adding a ferric component by itself. However, if the specimen Nos. 16, 20 and 21 are compared with the specimen Nos. 13, 9 and 10 having the same M value as those of the specimen Nos. 16, 20 and 21, in which a ferric component is added from the talc raw materials, the deterioration rates of the specimen Nos. 16, 20 and 21 are higher than those of the specimen Nos. 13, 9 and 10. Moreover, also in these cases, if the M value is not less than 10, shapes of them are not maintained in a high temperature, and they are not used as they are.

As mentioned above, in the case that a ferric component is added by itself, it is possible to use if the M value is in a range of 2–10, and the effect of the acid solution treatment can be maintained at a high temperature. However, the effect of the acid solution treatment is not so large as compared with the specimens in which a ferric component is added from the talc raw materials.

According to the invention, it is possible to obtain a batch, which can maintain the improving effect of the thermal shock resistivity after the acid solution treatment in a normal use, by setting the M value in a range of 2–10. In this case, it is preferred to use a ferric component the talc raw materials as a ferric source.

It should be noted that, in the embodiments mentioned above, the present invention is applied to the filter only, but the present invention can be applied to the others such as a catalyst carrier, a heat exchange device and so on.

What is claimed is:

1. A cordierite ceramic honeycomb comprising a cordierite phase as a main ingredient, said cordierite phase comprising 42–56 wt % $SiO_2$, 30–45 wt % $Al_2O_3$, 12–16 wt % MgO and an amount of $Fe_2O_3$ from a talc raw material, said cordierite ceramic honeycomb satisfying the following equation:

$$\{Fe_2O_3 \text{ wt \%}/(MgO \text{ wt \%}+Fe_2O_3 \text{ wt \%})\}\times100=2-10;$$

wherein a thermal expansion coefficient of said honeycomb is less than $0.5\times10^{-6}/°$ C. within a temperature range of 40°–800° C. in a direction parallel to a flow passage of said honeycomb.

2. The cordierite ceramic honeycomb of claim 1, wherein a value of $\{Fe_2O_3 \text{ wt \%}/(MgO \text{ wt \%}+Fe_2O_3 \text{ wt \%})\}\times100$ is 3–7.

3. The cordierite ceramic honeycomb of claim 1, wherein said honeycomb has a porosity of greater than 45%, and a thermal expansion coefficient less than $0.3\times10^{-6}/°$ C. within a temperature range of 40°–800° C. in a direction parallel to a flow passage of said honeycomb.

4. A method of producing a cordierite ceramic honeycomb comprising the steps of:

mixing raw materials for cordierite generation including talc, alumina and silica with forming agents and solvents to obtain a batch, wherein said talc contains $Fe_2O_3$ in an amount satisfying the following equation:

$$\{Fe_2O_3 \text{ wt \%}/(MgO \text{ wt \%}+Fe_2O_3 \text{ wt \%})\}\times100= 2-10;$$

extruding said batch to form a green honeycomb body;

drying said green honeycomb body to form a dried honeycomb body; and firing said dried honeycomb body at a temperature range of 1350°–1450° C. to form a fired honeycomb body.

5. The method of claim 4, wherein a value of $\{Fe_2O_3 \text{ wt \%}/(MgO \text{ wt \%}+Fe_2O_3 \text{ wt \%})\}\times100$ is 3–7.

6. The method of claim 4, further comprising the step of immersing said fired honeycomb body in an acid solution.

7. The method of claim 6, wherein a weight reduction rate of said fired honeycomb body after said acid solution immersing step is in a range of 0.5–2.0%.

8. The method of claim 6, wherein said acid solution is a nitric acid solution.

* * * * *